B. H. DIVINE.
VEHICLE TIRE.
APPLICATION FILED MAR. 6, 1911.
1,056,976.
Patented Mar. 25, 1913.
2 SHEETS—SHEET 1.
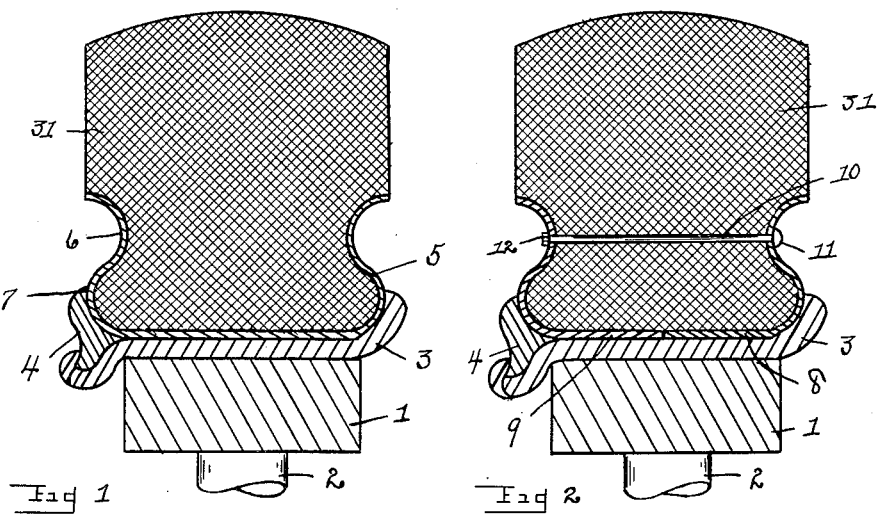
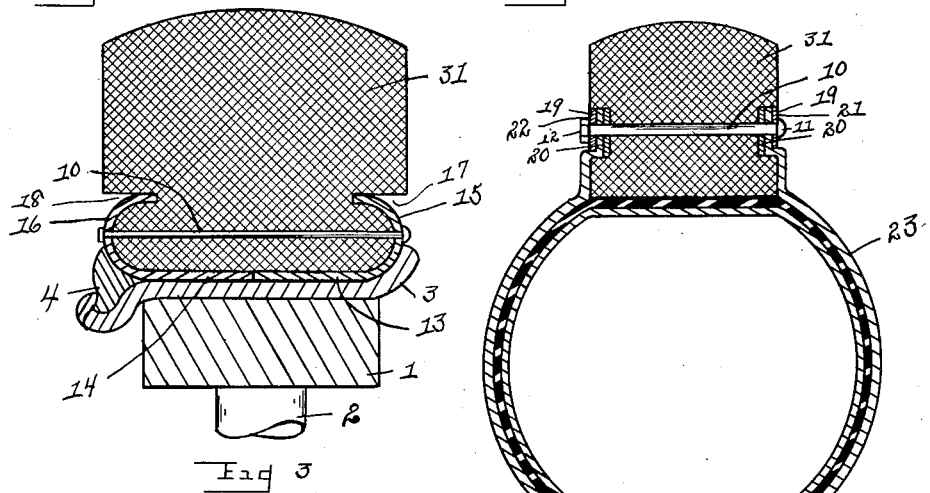
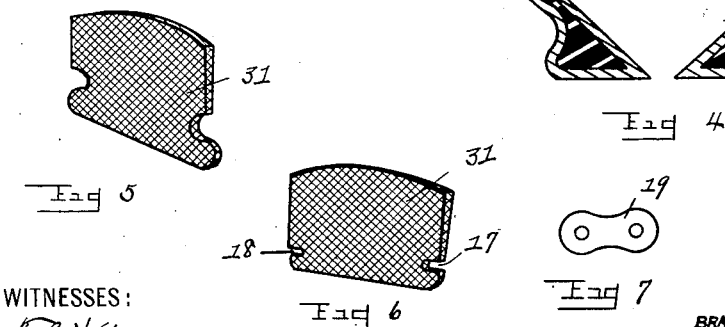
WITNESSES:
P. L. Wilder
E. T. De Giorgi.
INVENTOR
BRADFORD H. DIVINE
BY Risley & Love
ATTORNEYS

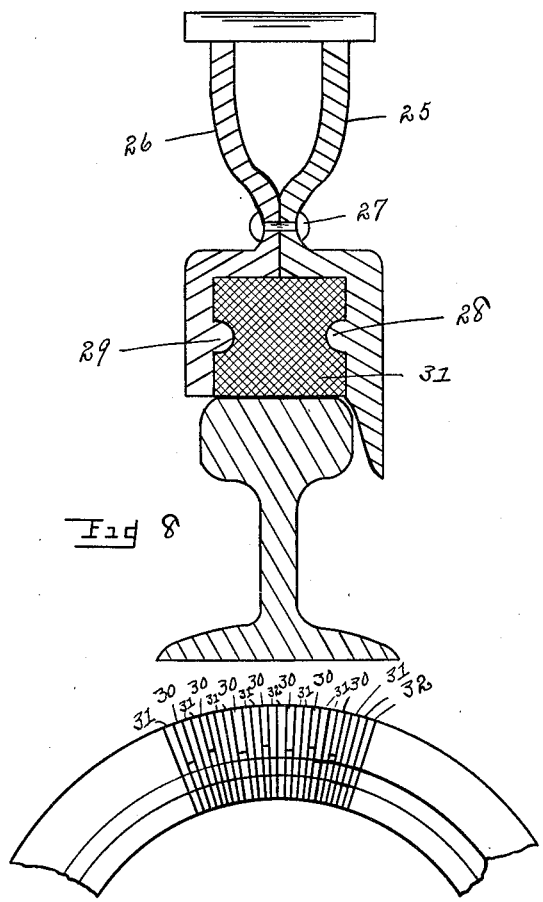

UNITED STATES PATENT OFFICE.

BRADFORD H. DIVINE, OF UTICA, NEW YORK.

VEHICLE-TIRE.

1,056,976.   Specification of Letters Patent.   Patented Mar. 25, 1913.

Application filed March 6, 1911. Serial No. 612,466.

*To all whom it may concern:*

Be it known that I, BRADFORD H. DIVINE, a citizen of the United States, residing at Utica, in the county of Oneida and State of New York, have invented certain new and useful Improvements in Vehicle-Tires, of which the following is a specification, reference being had therein to the accompanying drawing.

My invention relates to a vehicle tire, and I declare the following to be a full, clear, concise and exact description thereof, sufficient to enable any one skilled in the art to which it appertains to make and use the same reference being had to the accompanying drawings in which like reference characters refer to like parts throughout the specification.

The object of the invention is to provide a tire adapted for use upon vehicles of most any description, such as automobiles, wagons, trucks, railroad wheels, etc.

The tire comprises a plurality of pieces of plies of fabric, as leather, canvas, felt, or other similar material, treated with a suitable substance adapted to render same water proof, whereby to insure its indestructibility, and circumferentially pressed into the desired shape.

When assembled, the plies of the fabric are arranged with their strands or threads disposed oblique to the axis of the wheel. Such oblique disposition having been found by practical tests to be of considerable advantage with reference to wear. The pieces or plies themselves, are arranged radially, or transverse to the body of the wheel, whereby to effect a solid tread that will have little or no tendency to yield laterally, as would be the circumstance, were the plies arranged circumferentially to the wheel. The aforesaid arrangement of the plies of the fabric, with their threads oblique to the axis of the wheel and the plies themselves, arranged, transverse to the body of the wheel, permits the means for holding said plies more securely and in a manner adapted to retain the original shape of the tire during its entire existence.

Other uses and objects will appear by reference to the drawings in which;

Figure 1 is a transverse section of the tire; Fig. 2 is a transverse section of a slightly modified construction; Fig. 3 is a transverse section of a still further modification; Fig. 4 shows the tire mounted upon a pneumatic tire, said parts being in transverse section; Figs. 5 and 6 are perspective views of plies of fabric composing the tire; Fig. 7 is a detail of a link employed; Fig. 8 is a transverse section of the tire mounted upon the periphery of the wheel of a railroad car; Fig. 9 is a side elevation of a tire, partly showing the arrangement of the plies, somewhat exaggerated in thickness for the purposes of illustration; Fig. 10 is a fragmentary view showing the threads of the fabric, as disposed oblique to the axis of the wheel.

Referring more particularly to the drawings, I have represented the ordinary felly of a wheel by 1, supported by spokes 2. Upon felly 1 is mounted a circumferentially split rim comprising member 3, secured to the felly 1 in a proper manner, and member 4, detachably connected with member 3 in any well known way of the art. The aforesaid split rim supports an outer rim 5, adapted to hold the assembled plies of fabric in position. Said rim 5 may be formed with a compound curve on either side, thereof, as at 6 and 7, to conform with the contour of the corresponding part of the plies of fabric, seen in Fig. 1, or with a single curve as in Fig. 3.

In Fig. 2, outer rim 5 is circumferentially split, centrally thereof, and members 8 and 9, are held together by stay rods 10 headed, as at 11 and remotely threaded for the mounting of nuts 12. Said stay rods may be riveted at either end to rim 5. Further said stay rods 10 are disposed through suitable holes made in the fabric.

In Fig. 3, the outer rim 5 is somewhat modified in structure, to conform to the corresponding contour of the fabric. The rim here is circumferentially split and comprises two members 13 and 14 held together by stay rods 10, and provided with semi-circular or other shaped flanges 15 and 16, adapted to fit into and clench the fabric tire formed with corresponding-recesses 17 and 18 for the purpose.

Again in Fig. 4, I have shown the fabric tire applied or mounted to form the tread of a pneumatic tire. The outer canvas or shoe 23 of the pneumatic tire extends upward whereby its respective ends are firmly held to the tire by stay rods 10 pivotally holding on either side of the respective ends of the shoe 23, metal links 19 and 20, respectively. Said links 19 and 20 are pivotally connected to each other intermediate stay rods 10 and extend in a circle around on either side in recesses 21 and 22 of the tire. The employment of links 19 and 20 effects a flexible connection of the outer canvas or shoe 23 with the fabric tire, which in this instance serves as the tread. The advantages of a flexible connection of the tread and shoe 23 being apparent in view of the yielding tendency of a pneumatic tire.

In Fig. 8, the tire is shown assembled to a drive wheel of a railroad engine or to the ordinary wheel of a railroad car. Said wheel comprises members 25 and 26 held together by bolts or rivets 27. Members 25 and 26 have nubs 28 and 29 adapted to engage with corresponding recesses in the fabric tire whereby to hold same securely in position. The fabric tire when applied to the drive wheel of a railroad engine, as may be the case in this instance, has the useful function of clenching the rail in a more effective manner adapted to increase the traction power of the engine, as well as to deaden the sound.

The invention contemplates a uniform density of the fabric plies throughout its structure. Obviously, the mere circumferential cmopression of the plies of fabric into a tire, without any additional means to compensate for the variation in distance from the center of the parts of the plies, would produce a tire that would have one density along a plane nearest the center and a proportional variation or reduction in density, as the aforesaid plane receded from the center. This variation in density is equalized by the employment of shorter pieces of fabric at regular intervals in the make up of the tire. Such pieces are designated 30 in contrast to pieces 31, which are of full size, as seen in Fig. 9. There may be also seen in Fig. 9, at greater intervals, than the disposition of smaller pieces 30 of the fabric, metal pieces 32, correspondingly shaped with the pieces of fabric 30 and 31, and serving to effect an anti skidding device for the tire.

Although I have above stated that the density of the tire is uniform throughout, it may be found desirable in certain instances to have a variation in density, which effect could be readily accomplished.

Having thus described my invention, what I claim as new and desire to secure by Letters Patent is:

1. A tire for a vehicle wheel consisting of a hard compact ring composed of transverse radially-arranged plies of woven fabric compressed circumferentially, radially and transversely of the ring, and a binder for said ring holding said plies assembled and compressed.

2. A tire for a vehicle wheel consisting of a hard compact ring composed of transverse radially-arranged plies of woven fabric compressed circumferentially, radially and transversely of the ring, said plies having their threads arranged diagonally to form a wearing surface of thread ends, and a binder for holding said plies assembled and compressed.

3. In a vehicle tire, a plurality of pieces of fabric arranged transverse to the body of the wheel, certain of said pieces differing in size from others whereby to make the tire of uniform density, substantially as described.

In testimony whereof I have hereunto affixed my signature in the presence of two witnesses.

BRADFORD H. DIVINE.

Witnesses:
 ELEANOR T. DE GIORGI,
 T. L. WILDER.